US007203928B2

United States Patent
Mandava et al.

(10) Patent No.: US 7,203,928 B2
(45) Date of Patent: Apr. 10, 2007

(54) METHOD AND SYSTEM FOR GENERATING AND MAINTAINING UNIFORM TEST RESULTS

(75) Inventors: Ramesh Babu Mandava, San Jose, CA (US); Jean-Francois Arcand, Prevost (CA)

(73) Assignee: Sun Microsystems, Inc., Santa Clara, CA (US)

(*) Notice: Subject to any disclaimer, the term of this patent is extended or adjusted under 35 U.S.C. 154(b) by 591 days.

(21) Appl. No.: 10/334,502

(22) Filed: Dec. 31, 2002

(65) Prior Publication Data

US 2004/0128652 A1 Jul. 1, 2004

(51) Int. Cl.
*G06F 9/45* (2006.01)

(52) U.S. Cl. .................................... 717/124
(58) Field of Classification Search ................ 717/124
See application file for complete search history.

(56) References Cited

U.S. PATENT DOCUMENTS

| 5,737,609 | A | * | 4/1998 | Reed et al. ................. 717/126 |
| 6,067,639 | A | * | 5/2000 | Rodrigues et al. ............ 714/38 |
| 7,020,699 | B2 | * | 3/2006 | Zhang et al. ............... 709/223 |
| 7,054,881 | B2 | * | 5/2006 | Arcand et al. .............. 707/102 |

OTHER PUBLICATIONS

Desai, Test Case Management System (TCMS), 1994, IEEE, p. 1581-1585.*
Lee et al. Generating Test Cases for XML-based Component Ineteractions Using Mutation ANalysis, 2001, IEEE, p. 200-209.*
Shombert et al., Test Requirements Model . . . , 2000, IEEE, p. 380-387.*
Robbert et al., Automated Test Plan Generator . . . , 1991, ACM, p. 100-106.*
Liu et al., Structural Testing of Web Applications, 2000, IEEE, p. 84-96.*
Guerrieri, Software Document Reuse with XML, 2000, IEEE, p. 1-9.*

* cited by examiner

*Primary Examiner*—John Chavis
(74) *Attorney, Agent, or Firm*—Martine Penilla & Gencarella, LLP

(57) ABSTRACT

A method for maintaining standardized test results is provided. The method includes executing a test suite that includes embedded reporter codes and generating uniform test results using the embedded reporter codes. The embedded reporter codes are configured to include data as to anticipated test results and rationale supporting the anticipated test results. The method also includes storing the uniform test results so as to allow viewing of the uniform test results.

21 Claims, 13 Drawing Sheets

|   | Dynamic XML Results File | | |
|---|---|---|---|
|   | ID | Status | Status Description |
| 118a | T1-TC1 | P |   |
| 118b | T1-TC2 | P |   |
| 118c | T2-TC1 | P |   |
| 118d | T2-TC2 | F | Did not get reply from URL |

FIG. 2D

METHOD AND SYSTEM FOR GENERATING AND MAINTAINING UNIFORM TEST RESULTS

BACKGROUND OF THE INVENTION

1. Field of the Invention

The present invention relates generally to computer software execution, and more particularly, to methods and systems for collecting and preserving consistent results generated by execution of a computer software application.

2. Description of the Related Art

As the use of computer software in performing daily tasks is increasing rapidly, assessing software reliability through software testing has become an imperative stage in the software development cycle. As is well known, software testing is directed toward eliminating defects (i.e., bugs) in computer software, which if undetected, can create significant negative results.

As is well known, multiple groups of developers are involved in computer software application development, with each group being responsible for writing a certain portion of the application source code (i.e., a workspace). Each group is further responsible to ensure that its workspace functions properly. To achieve this task, different test applications are created by various test developers to specifically test each significant portion of the application source code.

Typically, test developers can exercise a great deal of freedom in creating test suites, such as, choosing a preferred format for generating the test results and associating different meanings with the generated test results. Consequently, one test developer may not be able to independently analyze and understand the test results generated as a result of test suites developed by different test developers and vice versa. Thus, the test developers are left with no option but to consult the test developer in charge of creating the executed test suite and test results so as to understand the true meaning associated with each entry in the test result reports. These unavoidable consultations, however, significantly and negatively effect the progress of software application development, as they are time consuming resulting in a significant waste of the valuable time of test developers.

Furthermore, if the computer system running the test suite crashes while executing a specific test suite, the test suites currently being executed either do not generate any type of a test report, and if a test report is generated, the test report merely contains a plurality of failed result entries. As a consequence, the test suites being run at the time of the system crash must be executed again in their entirely. Re-executing all the test suites in their entirely results in the loss of valuable resources and time, negatively effecting the software development process.

In view of the foregoing, there is a need for a flexible methodology and system for collecting and maintaining consistent test results generated as a result of a software application execution.

SUMMARY OF THE INVENTION

Broadly speaking, the present invention fills these needs by providing a method and a system to generate and maintain uniform results produced as a result of a software application execution. In one example, a reporter tool is provided to standardize and preserve standardized test results generated by a plurality of test applications testing a computer software application. In one embodiment, the software application being tested is a Java 2 Platform, Enterprise Edition (J2EE) application. It should be appreciated that the present invention can be implemented in numerous ways, including as a process, an apparatus, a system, a device, or a method. Several inventive embodiments of the present invention are described below.

In one embodiment, a method for maintaining standardized test results is provided. The method includes executing a test suite including embedded reporter codes and generating uniform test results using the embedded reporter codes. The embedded reporter codes are configured to include data as to anticipated test results and rationale supporting the anticipated test results. The method also includes storing the uniform test results so as to allow viewing of the uniform test results.

In another embodiment, a method for maintaining test results generated during testing of a software application by a plurality of test cases is provided. The method includes initiating the execution of the plurality of test cases so as to generate respective uniform test results. Source code for each of the plurality of test cases includes a plurality of embedded reporter codes. The method further includes storing uniform test results to a dynamic file using the plurality of embedded reporter codes. Also included in the method is storing the uniform test results generated up to a time of a system crash to storage as uniform test results if a system crash notification is received. The method also includes storing the uniform test results to storage at predefined intervals if a system crash notification is not received.

In yet another embodiment, a method for re-executing unexecuted test cases of a test suite being executed. The execution of the test cases in the test suite has been discontinued as a result of a system crash. The method includes providing a static file for the test suite. The static file is configured to include an entry for each test case in the test suite. The method also includes providing a dynamic file containing uniform test results generated by test cases having been executed up until the system crash. Also included is comparing the static file and the dynamic file. The method further includes matching each test case in the dynamic file with a corresponding test case in the static file so as to locate test cases not having a corresponding entry in the dynamic file. Also included is re-executing the test cases missing the corresponding entry in the dynamic file.

In still another embodiment, a method for maintaining standardized test results is provided. The method includes executing a test suite including embedded reporter codes and generating uniform test results using the embedded reporter codes. The method also includes storing uniform test results to a dynamic file temporarily. Also included is storing the uniform test results in the dynamic file to storage in a dynamic test results file.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2D is a simplified block diagram depicting a dynamic XML result file, in accordance with another embodiment of the present invention.

DETAILED DESCRIPTION OF THE PREFERRED EMBODIMENTS

Figure 1:
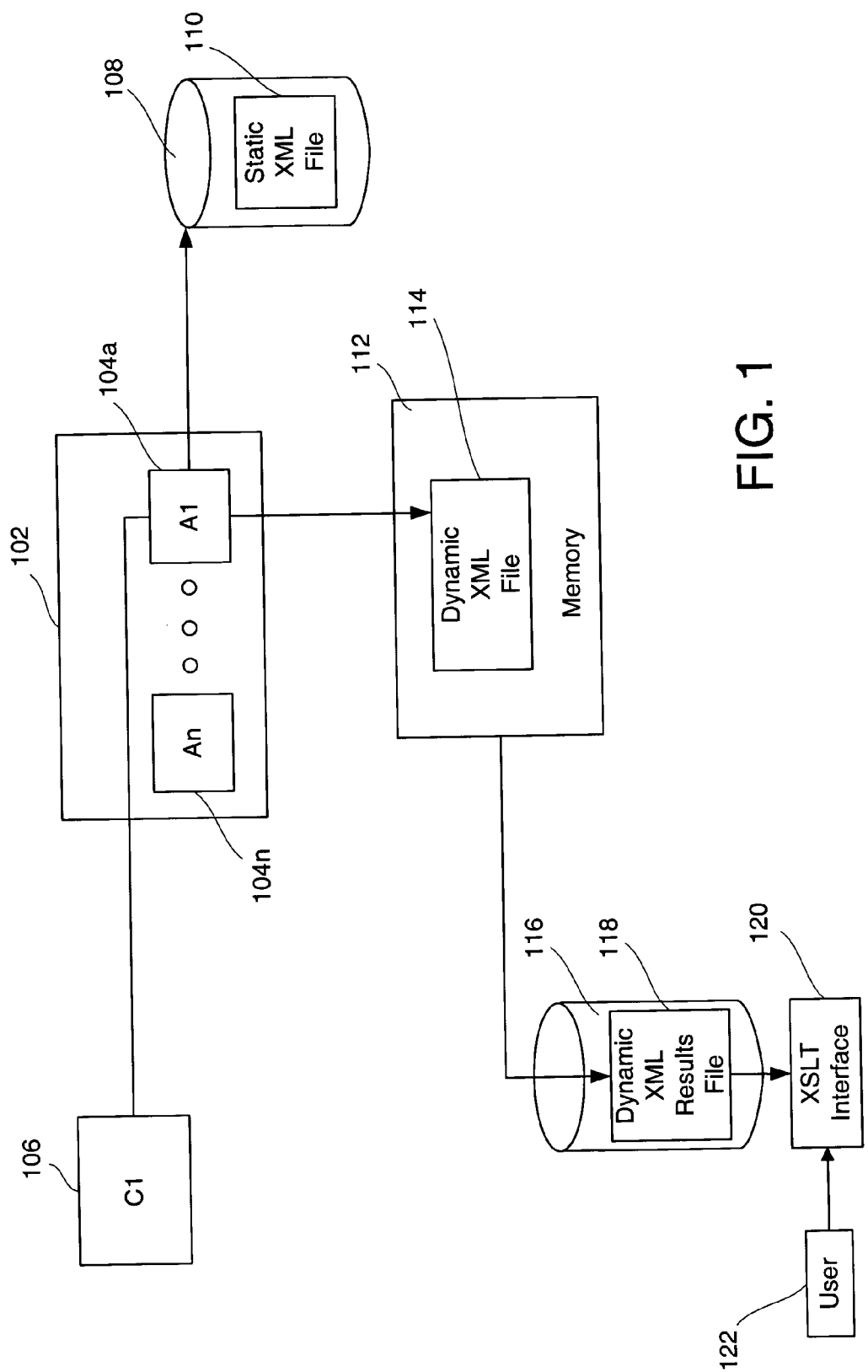
FIG. 1 is a simplified schematic diagram depicting storing of uniform results generated during execution of an application to storage, in accordance with one embodiment of the present invention.

Inventions for a reporter tool for standardizing and maintaining results generated by the execution of a software application are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

In one embodiment, the reporter tool of the present invention standardizes and preserves results generated by a plurality of applications using reporter codes embedded in the source code of the plurality of applications being processed. In one example, the plurality of applications being processed is a plurality of test suites testing a target application. In one instance, the target application is a Java 2 Platform, Enterprise Edition (J2EE).

According to one implementation, the embedded reporter codes are defined in the test suites by the test suite programmer as the test suite programmer writes the test suite. In another embodiment, a simple reporter adapter may be implemented to transform a quasi reporter code in a test suite to an embedded reporter code for use by the reporter tool of the present invention. By way of example, the embedded reporter codes may be defined after a test case is processed or a method is executed.

In one example, the test results generated by each line of source code of a test suite are outputted and temporarily stored to memory in a dynamic file. In one example, a format of the dynamic file is an Extensible Markup Language (XML). In one instance, the dynamic XML file may include a test case identification, a status of the test case, and a status description, if needed. The status of the test case may be "Pass," "Fail," or "Did Not Run." The status description provides an explanation describing the reasons the specific test case passed, failed, or did not run. The status descriptions are written inside the embedded reporter codes by the test suite programmer and are configured to be standardized and easily understandable by all developers.

The reporter tool of the present invention further preserves the generated results by storing to storage test results in the dynamic file periodically or prior to a system crash.

In one embodiment, an accompanying static file for each test suite is generated by the programmer either manually or with the help of the reporter tool. The static file is configured to include an entry for each test and test case in the test suite. In one example, the static file is configured to further include a respective description entry explaining the function of each test case or test.

As embodiments of the present invention implement the Enterprise JavaBeans (EJB) application, a brief introduction to EJB architecture is provided below. EJB is part of a larger overall technology known as the Java 2 Platform, Enterprise Edition (J2EE) developed by Sun Microsystems, Inc. J2EE provides architecture for developing, deploying, and executing applications in a distributed-object environment.

Summarily, EJB architecture promotes the creation of re-usable server-side behaviors or instructions in the Java language, connectors to enable access to existing enterprise systems, and easy-to-deploy program modules. The EJB architecture creates a collaborative architecture to provide services virtually anywhere, and for a wide range of customers and devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In one example, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components execute. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB beans were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance lifecycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As EJB implements the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping this brief overview to Enterprise Java Beans and Java in mind, reference is made to FIG. 1 depicting storing of uniform results generated during execution of an application to storage 116, in accordance with one embodiment of the present invention. As shown, a client 106 submits a plurality of applications 104a–104n for execution by a target application 102. In one embodiment, the applications 104a–104$_n$ are test suites each divided into a plurality of tests and test cases.

Each application 104a–104$_n$ is further divided into subparts, with each subpart containing lines of computer code. In accordance with one embodiment, as the application programmer develops the code for the applications 104a–104$_n$, the application programmer also creates a corresponding static XML file 110 for each of the applications 104a–104$_n$. Each static XML file 110 provides one viewing the static XML file 110 certain information about the respective application 104a–104$_n$. By way of example, the static XML file 110 provides a viewer information as to the name of the application, all subparts of the application, and a description defining the function of each subpart.

In one example, as the application programmer is developing the source code for the application 104a–104$_n$, the application programmer defines a plurality of embedded reporter codes after certain lines of computer code of the application. In one implementation, the embedded reporter codes are defined after a method call or any point in the application, as selected by the programmer. In this manner, a call is made to the immediately following embedded reporter code at the conclusion of execution the marked method. In this manner, as the uniform results for each method or subdivision of the code is created, a status description included in the embedded reporter code is inserted in the uniform results. As a result, one viewing the uniform results is provided adequate explanation as to the reasoning behind a pass or fail result generated for each of the methods or subdivisions.

As shown, at the same time the uniform results are generated, the uniform results are temporarily stored to a dynamic XML file 114 defined in the memory 114. In another embodiment, the uniform results are temporarily stored temporarily in Java objects. Thereafter, the uniform results are stored to storage 116 in a dynamic XML result file 118. The uniform results in the dynamic XML 118 can be viewed by a user 122 using a, Extensible Stylesheet Language (XSLT) Stylesheet interface 120.

Figure 2A:
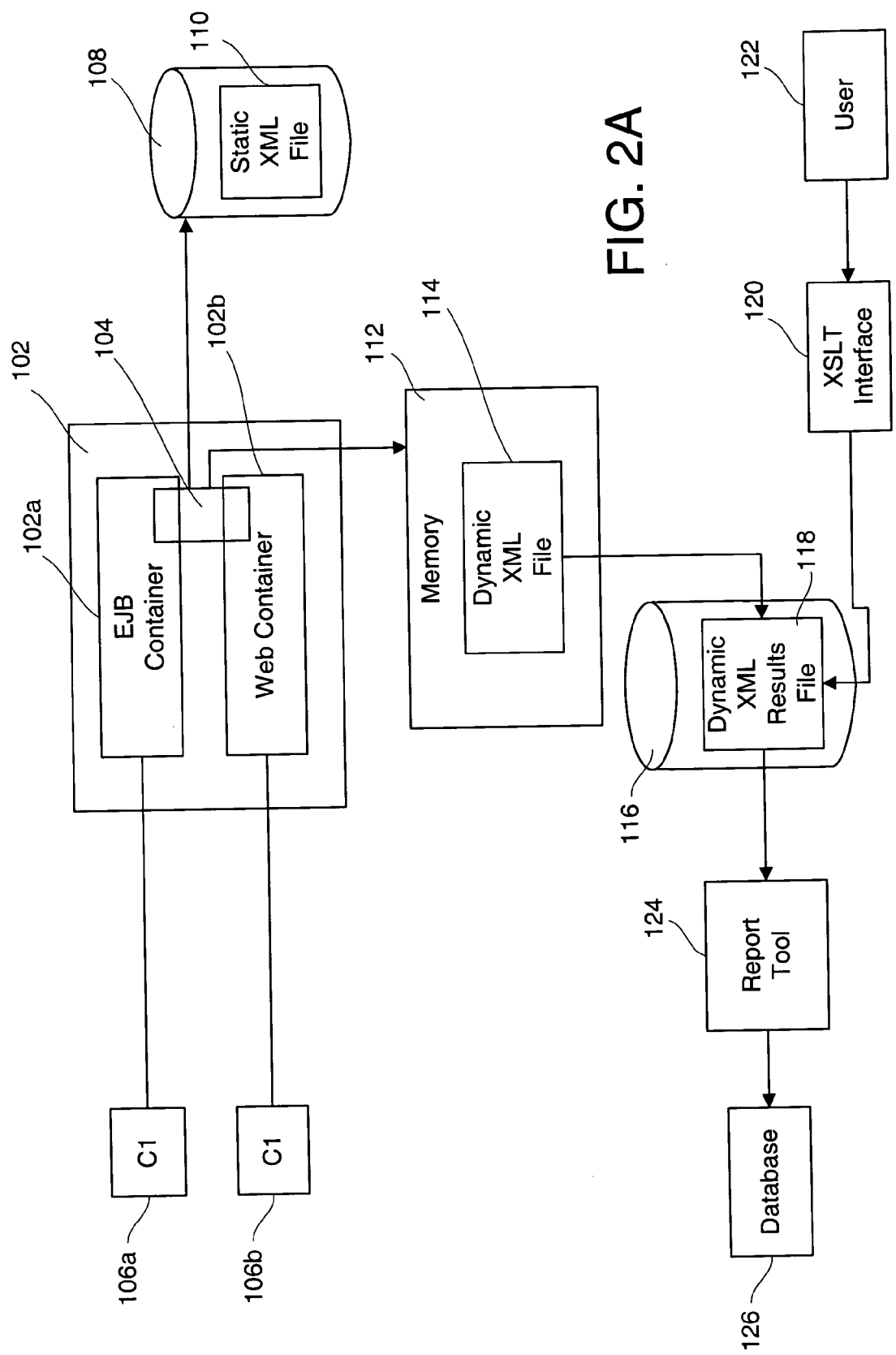
FIG. 2A is a simplified block diagram depicting periodic storing of standardized test results to storage, in accordance with another embodiment of the present invention.

FIG. 2A illustrates periodic storing of standardized test results generated as a result of testing J2EE application server 102 to storage 116, in accordance with one embodiment of the present invention. A client 106a and client 106b are shown to interact with EJB container 102a and Web container 102b defined in the J2EE application server 102. A test suite 104 is usually divided into a plurality of subparts called tests, with each test being divided into a plurality of test cases. In one example, each test case is configured to test a feature in the J2EE application 102. In accordance with one embodiment, while developing the source code for the test suite 104, the test suite developer also creates a companion static XML file 110 and stores same to storage 110. The static XML file 110 is written in accordance with a selected document type definition ("DTD") and is configured to provide an XML DTD for defining the static XML file. In one example, the XML DTD provides the test developers or the users a format of the static XML file. In one example, comments in the XML DTD provide additional requirements for the syntax and semantics of XML elements defined in the static XML file. Additionally, the static XML file is configured to include entries for each and every test and test case. In one instance, the static XML file also includes a comment describing the function of each test case and test.

In one embodiment, the test suite developer responsible for writing the test suite 104 deployed into the J2EE application server 102 defines a plurality of embedded reporter codes in the source code of the test suite 104. By way of example, the test suite developer may choose to define the embedded reporter codes after each line of source code, a method, or a test case, in the test suite 104. In one instance, the embedded reporter codes are application program interfaces (APIs). As designed, the APIs or the embedded reporter codes are configured to include information as to the expected test results for each test case or test as well as the reasoning a passed, failed, or not run test result is obtained. In this manner, different developers reviewing uniform test results generated by the reporter of the present invention can easily understand the standardized meaning associated with passing or failing of each test case or test.

In one embodiment, uniform test results generated during the execution of each line of code is outputted and stored to a dynamic XML file 114 in the memory 112. However, in another embodiment, uniform test results may be outputted to the dynamic XML file 114 whenever an embedded reporter code is executed. In this manner, the dynamic XML file 114 includes consistent test results for substantially all of the executed tests and test cases as well as a status description inserted by the embedded reporter codes, if required. It must be noted that in another embodiment, the uniform test results generated during the execution of each line of code is outputted and stored in Java objects.

In one exemplary embodiment, the reporter tool of the present invention can be implemented as shown in Table 1.

TABLE 1

Implementing Reporter Tool

| | | |
|---|---|---|
| 1. | Put reporter jar in Classpath. | In one embodiment, generally in library directory. By way of example, for webservices pak use <TestWorkSpace>/lib. In lib directory of each test workspace, reporter jar will be checked in and reporter jar can be put in CLASSPATH with build.sml. |
| 2. | import com.sun.ejte.reporter.* | |
| 3. | Use one version of Reporter.getInstance. | In one embodiment, i.e. Reporter.getInstance( ) Or Reporter.getInstance( String resultFilePath ). In this manner, Reporter instance can be obtained. In one example, resultFilePath may be affected if no other TestSuite create the instance of Reporter in that VM before this instance. Default value of resultFile is "ReporterResult.xml". And the default value for the valid (according to result.dtd) is "ReporterResultValid.xml." |
| 4. | Use one version of setTestSuite. | By way of example, i.e. setTestSuiteS String id, String name, String description ), setTestSuite( String id, String name ), or setTestSuite( String id ) |
| 5. | Add Test for the TestSuite using one version of addTest. | In one example, i.e. addTest( String testSuiteId, String testId, String testName, String testDescription ), addTest( String testSuiteID, String testId, String testName), or addTest( String testSuiteId, String testId). |
| 6. | Add TestCase for the Test using one version of addTestCase. | i.e. addTestCase( String testSuiteId, String testId, String testCaseId, String testCaseName, String testCaseDescription ), addTestCase( String testSuiteId, String testId, String testCaseId, String testCaseName), or addTestCase( String testSuiteId, String TestId, String testCaseId, String testCaseName). |
| 7. | Set Status for TestCase using one version of setTestCaseStatus. | In one example, i.e. setTestCaseStatus( String testSuiteId, String testId, String testCaseId, String testCaseStatus, String testCaseStatusDescription ), or setTestCaseStatus( String testSuiteId, String testId, String testCaseId, String testCaseStatus ). In one embodiment, Status is "ReporterConstants.PASS" or "ReporterConstants.FAIL". In one instance, Default value for the status is "did_not_run." |
| 8. | Set Status for Test using one version of setTestStatus. | In one embodiment, i.e., setTestStatus ( String testSuiteId, String testId, String testStatus, String testStatusDescription ) or setTestStatus( String testSuiteId, String testId, String testStatus ). By way of example, Status is "ReporterConstants.PASS" or "ReporterConstants.FAIL". In one instance, usage of setTestStatus is optional and can be performed before setTestCaseStatus or addTestCase. |
| 9. | | In one instance, to flush information for a Test Suite, use flush( String testSuiteId ). |
| 10. | | In one example, to flush information about all Test Suites, use flushAll( ). |
| 11. | | In one embodiment, to generate validReport according to the DTD, with machineName, OS, jdkVersion etc., use generate ValidReport( ). By way of example, this method can be called anytime and as many time as needed. This method can also be called when the virtual machine exits. In one example, this method can be used to flush information. An exemplary name of the valid result file is ResultFile truncated after"." and has Valid.xml appended to it. For instance, i.e if resultFile is "foo.xml," the valid resultFile is "fooValid.xml." |

The embodiments of the present invention are further designed to store uniform test results to storage periodically or prior to receiving a system crash notice. By way of example, uniform test results may be stored to the dynamic XML result file defined in the storage 116 at prescheduled intervals. In another instance, uniform test results are stored to storage 116 after receiving a crash notice from a virtual machine. In such situation, uniform test results are temporarily stored to the dynamic XML file 114 in the memory 112. Thereafter, the dynamic XML file 114 is flushed and stored to storage 116. In this manner, the dynamic XML result file 118 includes all test results up to the point of crash. As to the test cases and tests not yet executed, in one embodiment, a corresponding results entry for such test case may not be included in the dynamic XML result file 118. However, in another embodiment, the dynamic XML result file may include a "Did Not Run" entry as well as a status description for each test or test suite not run. The status description is configured to describe possible scenarios due to which the tests were not executed.

In one illustrated implementation, the user 112 can request displaying of uniform test results in a desired display format using the XSLT interface 120. In one example, the user 122 may choose to view the uniform test results in Hyper Text Markup Language (HTML). In such scenario, the XSLT component 120 is used to transform the XML format of the dynamic XML result file 118 to HTML, as requested by the user 122.

One having ordinary skill in the art must appreciate that storage 116 can be any suitable storage means (e.g., hard drive, Redundant Array of Independent Disks (RAID), network attached storage (NAS), etc.) Furthermore, one of ordinary skill in the art should note that memory 112 can be any appropriate means for temporary storing of data (e.g., random access memory (RAM), etc.) Additionally, although the embodiments of the present invention have been shown to implement XML file formats, in a different embodiment, any suitable file format may be implemented (e.g., csv (Excel format), Oracle table format, etc.). In a like manner, the embodiments of the present invention may further implement any suitable format transformation tool rather than XSLT Stylesheet (e.g., Java transformation, Perl transformation, etc.).

Figure 2B:
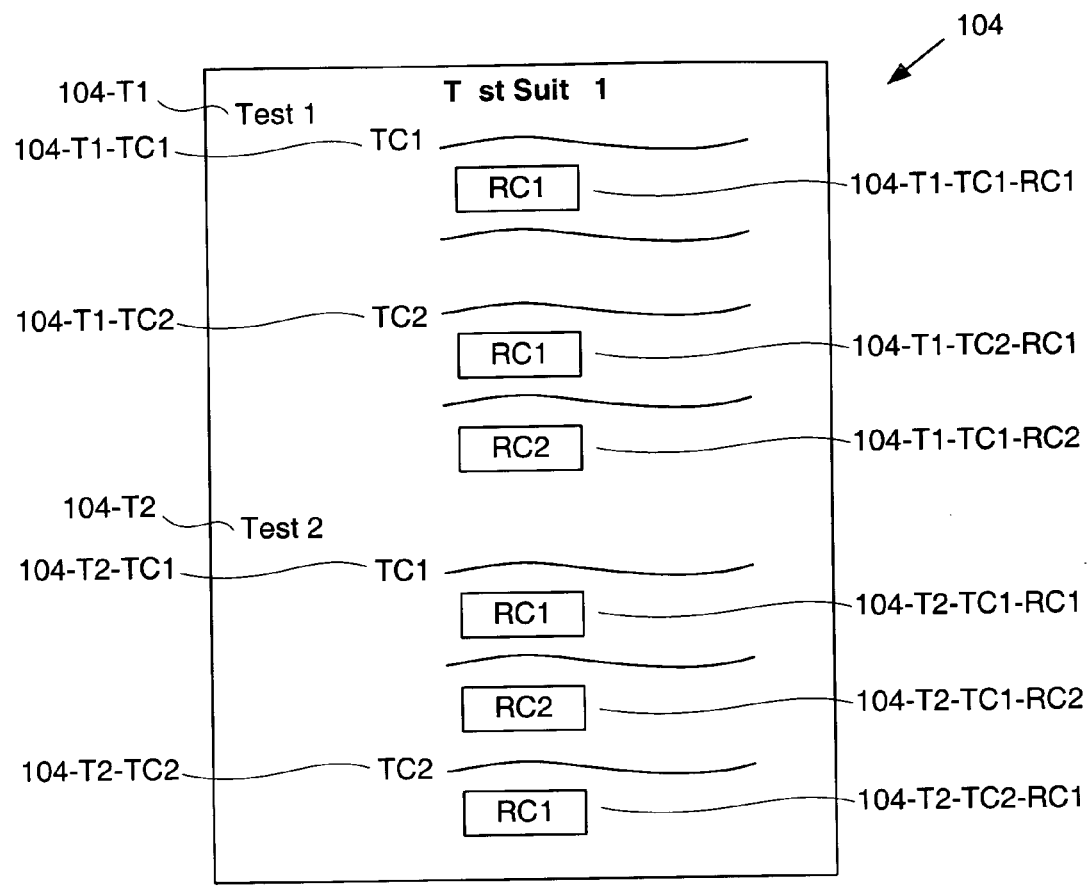
FIG. 2B is a simplified block diagram depicting a structure of an exemplary test suite, in accordance with another embodiment of the present invention.

A structure of the test suite 104 can further be understood with respect to the exemplary test suite 104 shown in FIG. 2B, in accordance with one embodiment of the present invention. The test suite 104 includes a first test 104-*t*1 and a second test 104-*t*2, with the first test 104*t*1 being divided into two test cases 104-*t*1-*tc*1 and 104-*t*1-*tc*2 and the second test 104-*t*2 being divided into two test cases 104-*t*2-*tc*1 and 104-*t*2-*tc*2. As shown, a test case 104-*t*1-*tc*1 is shown to include an embedded reporter code 104-*t*1-*tc*1-*rc*1 while the test case 104-*t*1-*tc*2 includes reporter codes 104-*t*1-*tc*2-*rc*1 and 104-*t*1-*tc*2-*rc*2. In a like manner, a test case 104-*t*2-*tc*1 is shown to include embedded reporter codes 104-*t*2-*tc*1-*rc*1 and 104-*t*2-*tc*2-*rc*2 while the test case 104-*t*2-*tc*2 includes the embedded reporter code 104-*t*2-*tc*2-*rc*1.

Figure 2C:
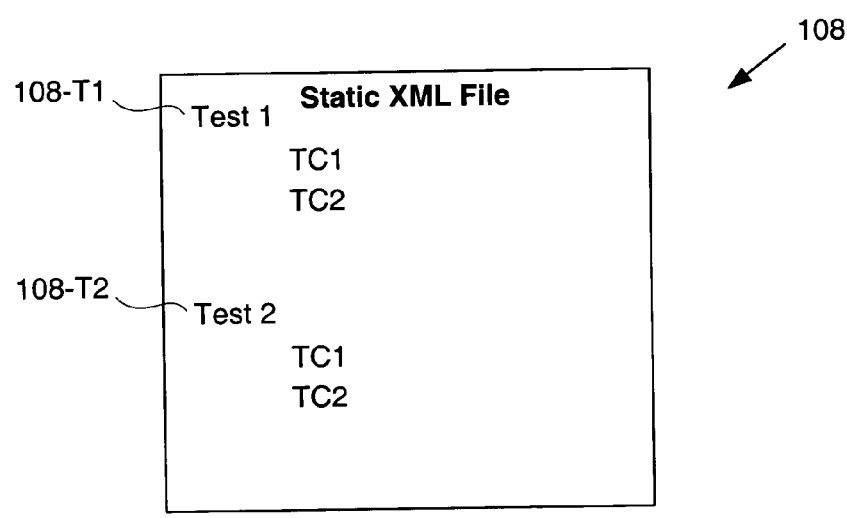
FIG. 2C is a simplified block diagram depicting an exemplary static XML file, in accordance with another embodiment of the present invention.

FIG. 2C shows an exemplary static XML file 108, in accordance with one embodiment of the present invention. As shown, the companion static XML file 108 for the test suite 104 includes entries 108-*t*1 and 108-*t*2 for the first test and the second test as well as their respective test cases.

FIG. 2D illustrates an exemplary dynamic XML result file 118, in accordance with one embodiment of the present invention. The exemplary dynamic XML result file 118 provides a user certain information such as an identification of a test or test case, the Pass, Fail, or Did Not Run status of the test or the test case, and a status description of a test or test case, if needed. By way of example, the test cases shown in entries 118*a* through 118*c* are shown to have a Pass status, while the entry 118*d* is shown to have a Fail status. In this embodiment, the user reviewing the uniform test results stored to the dynamic XML results file is provided a specific reasoning as to the failure of the test case t2-tc2 of the entry 118*d*. In this instance, the test case is failed due to not receiving a reply from the URL. Although in this embodiment a status description has not been provided for test cases having the Pass status, in another example, the test suite developer may choose to include the reasoning supporting the passing or failing of a certain test or test case.

Table 2 illustrates an exemplary dynamic XML results file, in accordance with one embodiment of the present invention.

TABLE 2

Result Report

EXECUTION DATE: FRI MAY -----

Configuration Information

| Machine Name | krishna2 |
| --- | --- |
| Server Name | |
| Server Version | |
| OS | SunOS5.8 |
| JDK Version | 1.3.1_03 |

SUMMARY TEST RESULTS

| Item | Total | Pass | Fail | Did Not Run |
| --- | --- | --- | --- | --- |
| Test Suites | 8 | | | |
| Tests | 35 | 35 | 0 | 0 |
| Test Cases | 0 | 0 | 0 | 0 |

TABLE 2-continued

Result Report

DETAILED RESULTS 1. jaxm_soaprp
2. saaj_sync
3. saaj_soap
4. jaxm_sync
5. jaxm_soap
6. saaj_misc
7. jaxm_misc
8. jaxm_ebxml

| Testsuite Number | 1 |
| --- | --- |
| Testsuite Id | jaxm_soaprp |
| Testsuite Name | |
| Testsuite Description | |

| ID | Name | Description | Status | Status Description |
| --- | --- | --- | --- | --- |
| Rps end-rprecv | | Messaging Provider (soaprp) Test: To check asynchronous inquiry with two separate web applications for send and receive. Also checking long-lived transaction | | |
| rpmime | | Test to Check if Messaging Provider (soaprp profile) delivers attachments of different content types | pass | |
| rpsendmodhdr-rprecvmodhdr | | Messaging Provider (soaprp) Test: To check if message exchange is happening if the soaprp header is changed at the receiver | Pass | |

| Testsuite Number | 2 |
| --- | --- |
| Testsuite Id | saaj_sync |
| Testsuite Name | |
| Testsuite Description | |

| ID | Name | Description | Status |
| --- | --- | --- | --- |
| syncinquiry11 | | Synchronous Inquiry | pass |
| syncupdate11 | | Synchronous Update | pass |
| roundtrip11 | | Check the roundtrip of synchronous message with attachment | pass |
| roundtripwoa11 | | Check the roundtrip of synchronous message just with SOAPPart | pass |
| roundtripmime11 | | Check the roundtrip of synchronous message with application/x-mswrite attachment | pass |
| multiattach11 | | Check attaching and retrieval of different content type attachments | pass |
| apcontent11 | | Check AttachmentPart content correctness at recipient | pass |
| spaptest | | Check SOAPPart and AttachmentPart Mime header content correctness at recipient | pass |

| Testsuite Number | 3 |
| --- | --- |
| Testsuite Id | saaj_soap |
| Testsuite Name | |
| Testsuite Description | |

| ID | Name | Description | Status | Status Description |
| --- | --- | --- | --- | --- |
| bodytest11 | | Check if the mandatory element SOAPBody is present in SOAPEnvelope | pass | |
| hdrtest11 | | Check if SOAPHeader (if present) appears before SOAPBody in SOAPEnvelope | pass | |
| faulttest11 | | Check if SOAPFault is preserved in synchronous messaging | pass | |

TABLE 2-continued

Result Report

| | | | | |
|---|---|---|---|---|
| soapfact | | Checks if SOAPFactory (new SAAJ class) works properly | pass | |
| mimehdrtest | | Check if all MimeHeaders' values are preserved with call | pass | |

| | | | |
|---|---|---|---|
| | Testsuite Number | | 4 |
| | Testsuite Id | | jaxm_sync |
| | Testsuite Name | | |
| | Testsuite Description | | |

| ID | Name | Description | Status | Status Description |
|---|---|---|---|---|
| syncinquiry | | Synchronous Inquiry | pass | |
| syncupdate | | Synchronous Update | pass | |
| Roundtrip | | Check the roundtrip of synchronous message with attachment | pass | |
| roundtripwoa | | Check the roundtrip of synchronous message with SOAPPart | pass | |
| roundtripmime | | Check the roundtrip of synchronous message with application/x-mswrite attachment | pass | |
| multiattach | | Check attaching and retrieval of different content type attachments | pass | |
| apcontent | | Check AttachmentPart content correctness at recipient | pass | |

| | | | |
|---|---|---|---|
| | Testsuite Number | | 5 |
| | Testsuite Id | | jaxm soap |
| | Testsuite Name | | |
| | Testsuite Description | | |

| ID | Name | Status | | Status Description |
|---|---|---|---|---|
| bodytest | | Check if the mandatory element SOAPBody is present in SOAPEnvelope | pass | |
| hdrtest | | Check if SOAPHeader (if present) appears before SOAPBody in SOAPEnvelope | pass | |
| faulttest | | Check if SOAPFault is preseved in synchronous messaging | pass | |

| | | | |
|---|---|---|---|
| | Testsuite Number | | 6 |
| | Testsuite Id | | saaj_misc |
| | Testsuite Name | | |
| | Testsuite Description | | |

| ID | Name | Description | Status | Status Description |
|---|---|---|---|---|
| authenticate11 | | Check Http BASIC Authentication | pass | Got reply from URL <http://jaxm-test:changeit@localhost:8080/authenticate11/receiver> |
| msgtrav11 | | Test to check Message Traversal | pass | |
| uddiquery11 | | Check SOAP interoperability with IBM Test Registry | pass | |

| | | | |
|---|---|---|---|
| | Testsuite Number | | 7 |
| | Testsuite Id | | jaxm_misc |
| | Testsuite Name | | |
| | Testsuite Description | | |

| ID | Name | Description | Status | Status Description |
|---|---|---|---|---|
| authenticate | | Check Http BASIC Authentication | pass | Got reply from URL <http://jaxm-test:changeit@localhost:8080/authenticate/receiver> |
| msgtrav | | Test to check Message Traversal | pass | |

TABLE 2-continued

Result Report

| | | |
|---|---|---|
| uddiquery | Check SOAP interoperability with IBM Test Registry | pass |

| | |
|---|---|
| Testsuite Number | 8 |
| Testsuite Id | jaxm_ebxml |
| Testsuite Name | |
| Testsuite Description | |

| ID | Name | Description | Status | Status Description |
|---|---|---|---|---|
| ebmime | | Check if Messaging Provider (ebxml profile) delivers attachments of different content types | pass | |
| ebsend-ebrecv | | Messaging Provider (ebxml) Test: To check asynchronous inquiry with two separate web applications for send and receive. Also checking long-lived transaction | pass | |
| ebsendmodhdr-ebrecvmodhdr | | Messaging Provider (ebxml) Test: To check if message exchange is happening if the ebxml header is changed at the receiver | pass | |

Figure 3A:
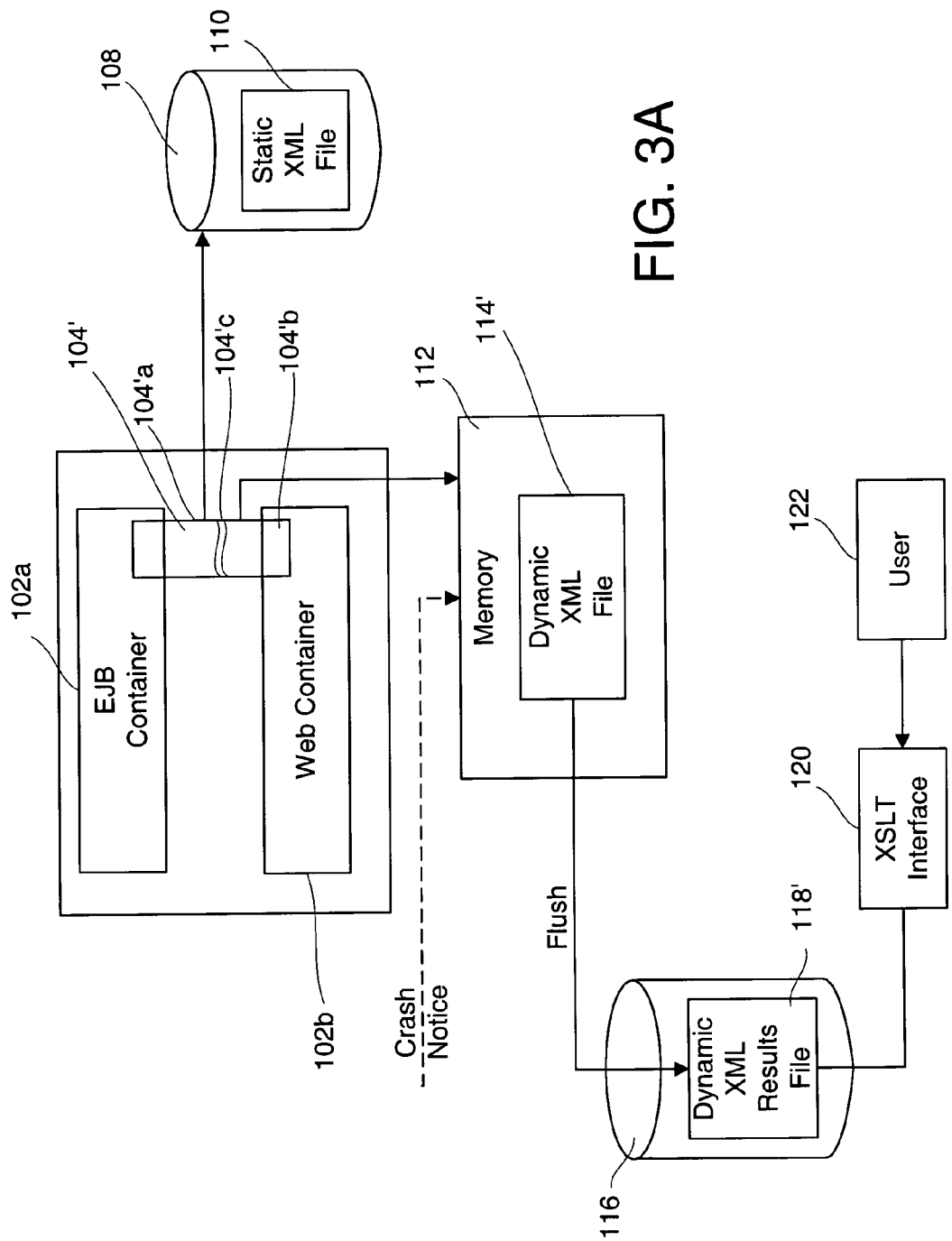
FIG. 3A is a simplified block diagram depicting preserving of uniform test results prior to a system crash, in accordance with another embodiment of the present invention.

Preserving of uniform test results prior to a system crash is illustrated in FIG. 3A, in accordance with one embodiment of the present invention. As shown, a static XML file 110 including all the test cases and tests in the test suite 104' is stored to storage 108. In one example, as the test suite 104' is being executed, uniform test results are being stored to the dynamic XML file 114'.

In the embodiment of FIG. 3A, a crash notice 128 is received from the virtual machine at which point, only a first portion 104'*a* of the test suite 104' is shown to have been executed. Nevertheless, uniform test results generated during the execution of the first portion 104' is stored to the memory 112 in the dynamic XML file 114'. Upon receiving the crash notice, the uniform test results stored to memory 112 is flushed and outputted to the dynamic XML result file 118' and is stored to storage 116. In one embodiment, Java VMs addShutdownHook facility is implemented to achieve this functionality. Thereafter, as stated in more detail above, the user 122 is given an option to view uniform test results stored to storage 116 in any display format requested by the user 122 using the XSLT interface 120.

Figure 3B:
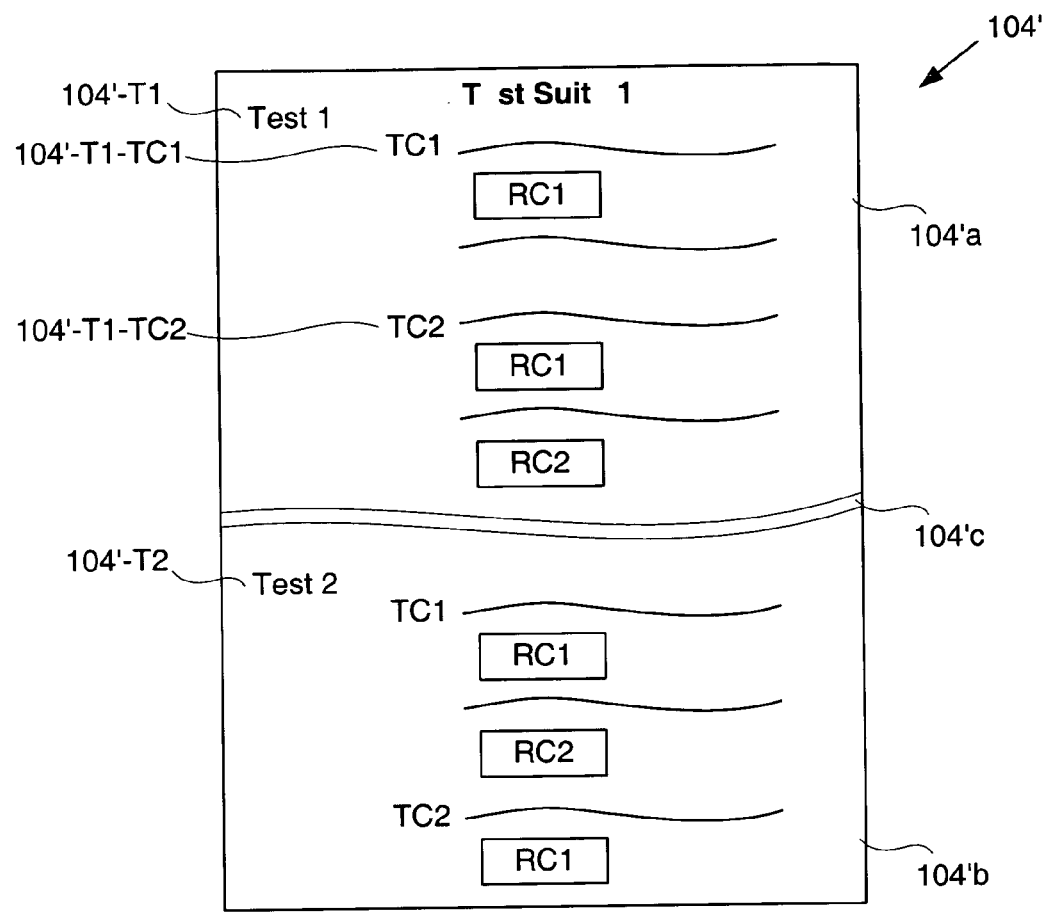
FIG. 3B is a simplified schematic diagram illustrating the division of a test suite to first portion and second portions at a point of crash, in accordance with another embodiment of the present invention.
Figure 3C:
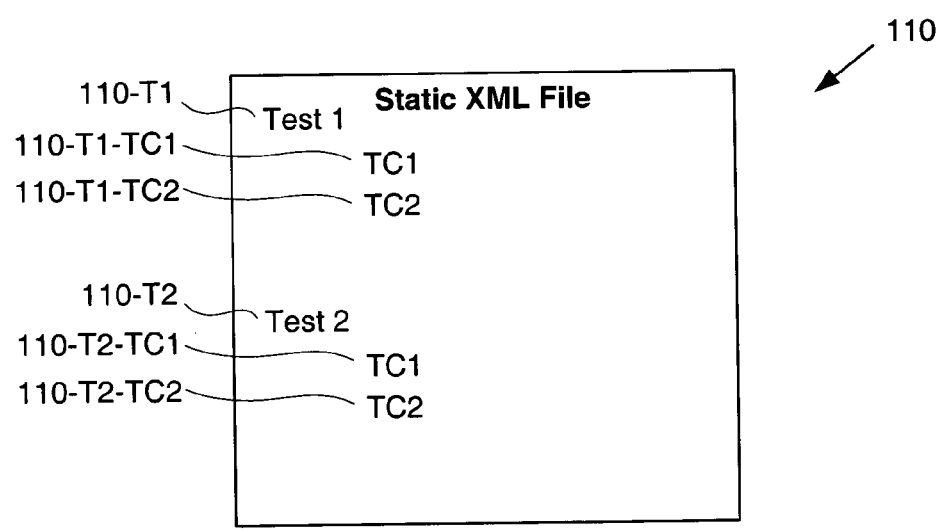
FIG. 3C is a simplified schematic diagram illustrating the static XML file accompanying the test suite depicted in FIG. 3B, in accordance with another embodiment of the present invention.

FIG. 3B illustrates the division of the test suite 104' to the first and second portions 104'*a* and 104'*b* at the point of crash 104'*c*, in accordance with one embodiment of the present invention. As shown, the test suite 104' is conceptually divided into two portions 104'*a* and 104'*b* as illustrated by the point 104'*c* representing the point of interruption of the test suite 104' execution. Thus, while the test suite 104 includes the first test and the second test 104'-*t*1 and 104'*t*2, the first test 104'*t*1 is shown to have been executed prior to the system crash. However, the static XML file 110 is still shown to include all the test cases and tests defined in the test suite 104', as shown in accordance with one embodiment in FIG. 3C.

Figures 3D, 3E:
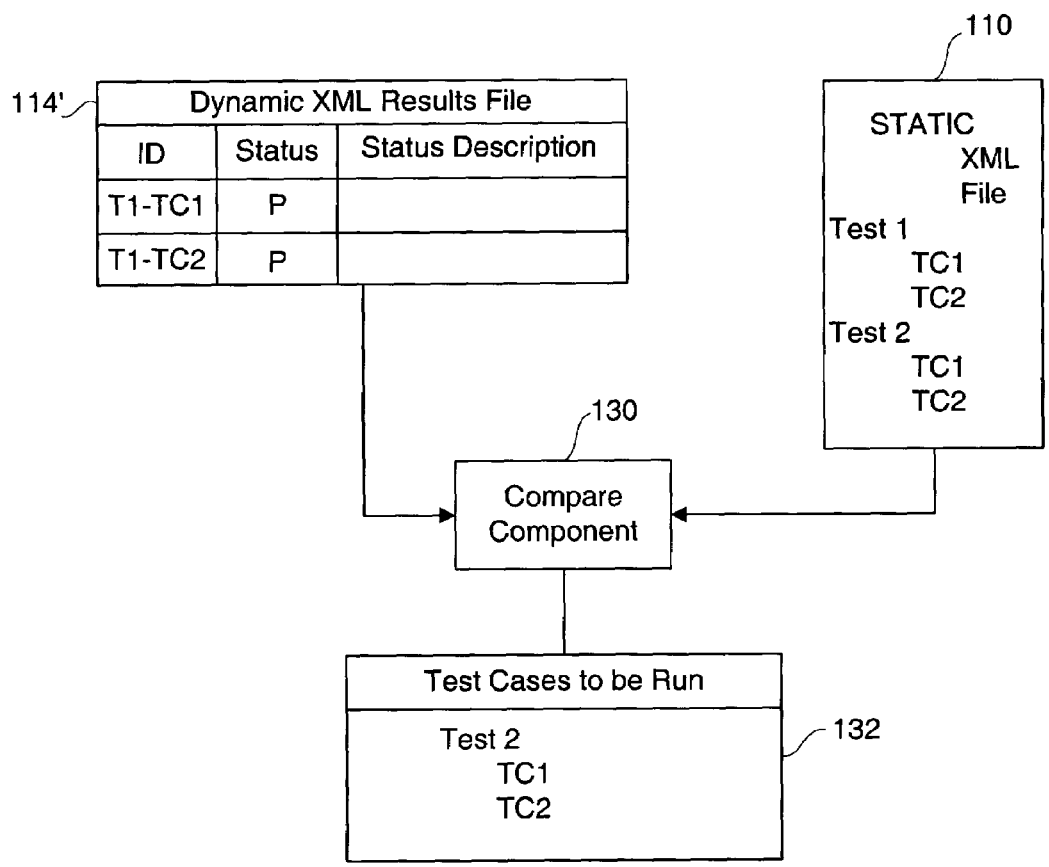
FIG. 3D is a simplified schematic diagram illustrating the dynamic XML result file created prior to the system crash in FIG. 3A, in accordance with another embodiment of the present invention.
FIG. 3E is a simplified schematic diagram illustrating capability of the present invention to eliminate the necessity to re-execute all tests and test cases in the test suite subsequent to a system crash, in accordance with another embodiment of the present invention.

The dynamic XML results file 114' shown in FIG. 3D, however, includes Pass status for test cases 104'-*t*1-*tc*1 and 104'-*t*1-*tc*2 in the first test as shown in entries 114'*a* and 114'*b*. However, corresponding entries are not shown for the test cases in the second test 104'-*t*2. Thus, embodiments of the present invention are capable of preserving and storing the uniform test results up to the point of crash, advantageously eliminating the necessity of re-executing all tests and test cases in the test suite in case of a system crash. In this manner, uniform test results can be generated for all the remaining tests and test cases by executing those test cases not executed prior to the system crash, saving computing resources as well as developers' time.

FIG. 3E illustrates the capability of the present invention to eliminate the necessity to re-execute all tests and test cases in the test suite subsequent to a system crash, in accordance with one embodiment of the present invention. As shown, the tests and test cases in the static XML file 110 are compared with the tests and test cases in the dynamic XML result file 114' using a compare component 120. In this manner, comparing the two files would reveal the test cases or tests not yet executed as a result of the system crash. In one example, the tests and test cases not yet run are re-submitted for execution for a second time.

Figure 4:
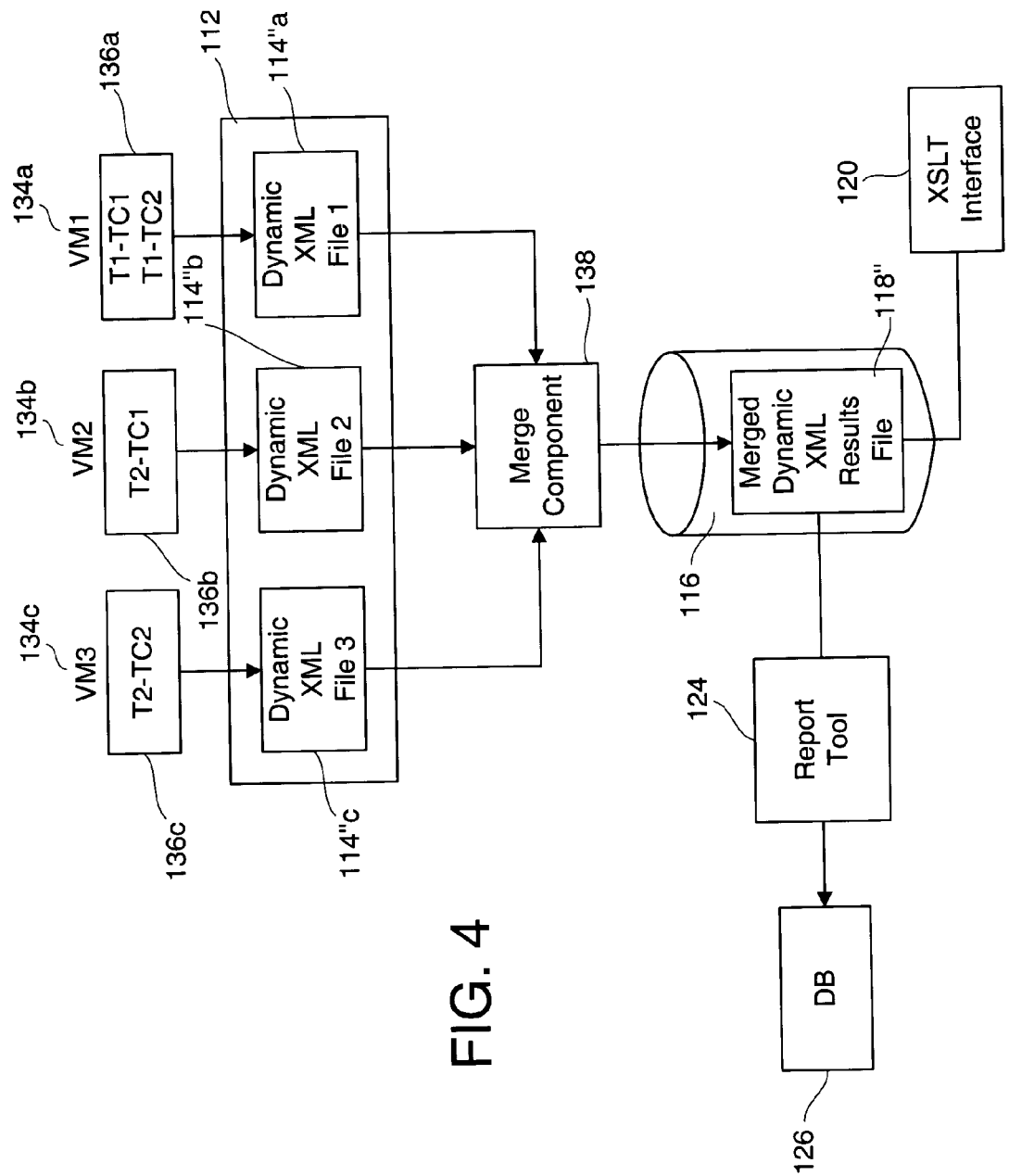
FIG. 4 is a block diagram illustrating execution of different portions of a test suite by a respective virtual machine, in accordance to yet another embodiment of the present invention.

In accordance with one exemplary embodiment, the test suite 104 can be divided into portions 136*a* through 136*c*, each portion 136*a*–136*c* being assigned to be executed by a respective virtual machine 134*a* through 134*c*, as shown in the embodiment of FIG. 4. Each virtual machine 134*a*–134*c* is shown to generate a respective uniform test results correspondingly stored to first dynamic XML file 114"*a*, second dynamic XML file 114"*b*, and third dynamic XML file 114"*c* in the memory 112. Thereafter, a merge component 138 can be implemented to merge the uniform test results in the first dynamic XML file 114"*a*, second dynamic XML file 114"*b*, and third dynamic XML file 114"*c* into a merged dynamic XML results file 118" stored to storage 116.

Figure 5:
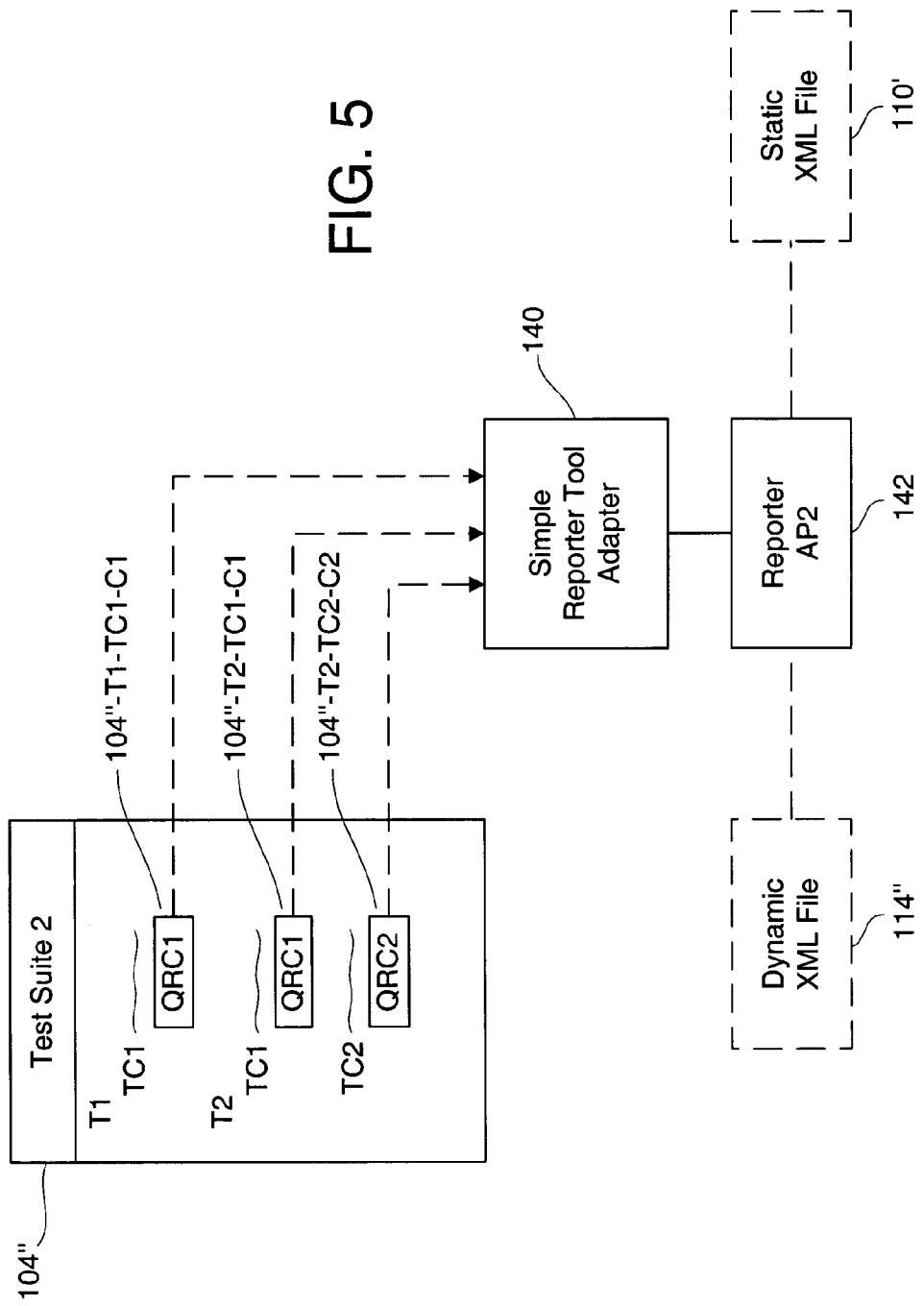
FIG. 5 depicts preserving of uniform test results generated by a test suite including existing quasi reporter codes, in accordance with yet another embodiment of the present invention.

In accordance to another example, the embodiments of the present invention can be implemented to preserve uniform test results generated by a test suite including existing quasi reporter code, as shown in the embodiment of FIG. 5. As shown, the test suite 104" is shown to include a plurality of existing quasi reporter codes 104"-*t1*-*tc1*-*qc1*, 104"-*t2*-*tc1*-*qc1*, and 104"-*t2*-*tc1*-*qc2*. In one embodiment, the quasi reporter codes 104"-*t1*-*tc1*-*qc1*, 104"-*t2*-*tc1*-*qc1*, and 104"-*t2*-*tc1*-*qc2* are "status.u" codes.

The illustrated quasi reporter codes 104"-*t1*-*tc1*-*qc1*, 104"-*t2*-*tc1*-*qc1*, and 104"-*t2*-*tc1*-*qc2* are fed into a simple reporter tool adapter 140 creating reporter API 142. As shown in the embodiment of FIG. 5, the simple reporter tool adapter 140 is configured to mimic the embedded reporter code (e.g., API) used in the reporter tool of the present invention. Thereafter, as discussed above in more detail, the static XML file 110' and dynamic XML file 114''' are created. In this manner, the simple reporter tool adapter 140 is created to change the existing quasi reporter codes to embedded reporter codes. Thus, the reporter tool of the present invention is very powerful and flexible as the reporter tool eliminates the necessity to manually insert the embedded reporter codes in the test suite 104" when the source code includes existing quasi reporter codes.

Figure 6:
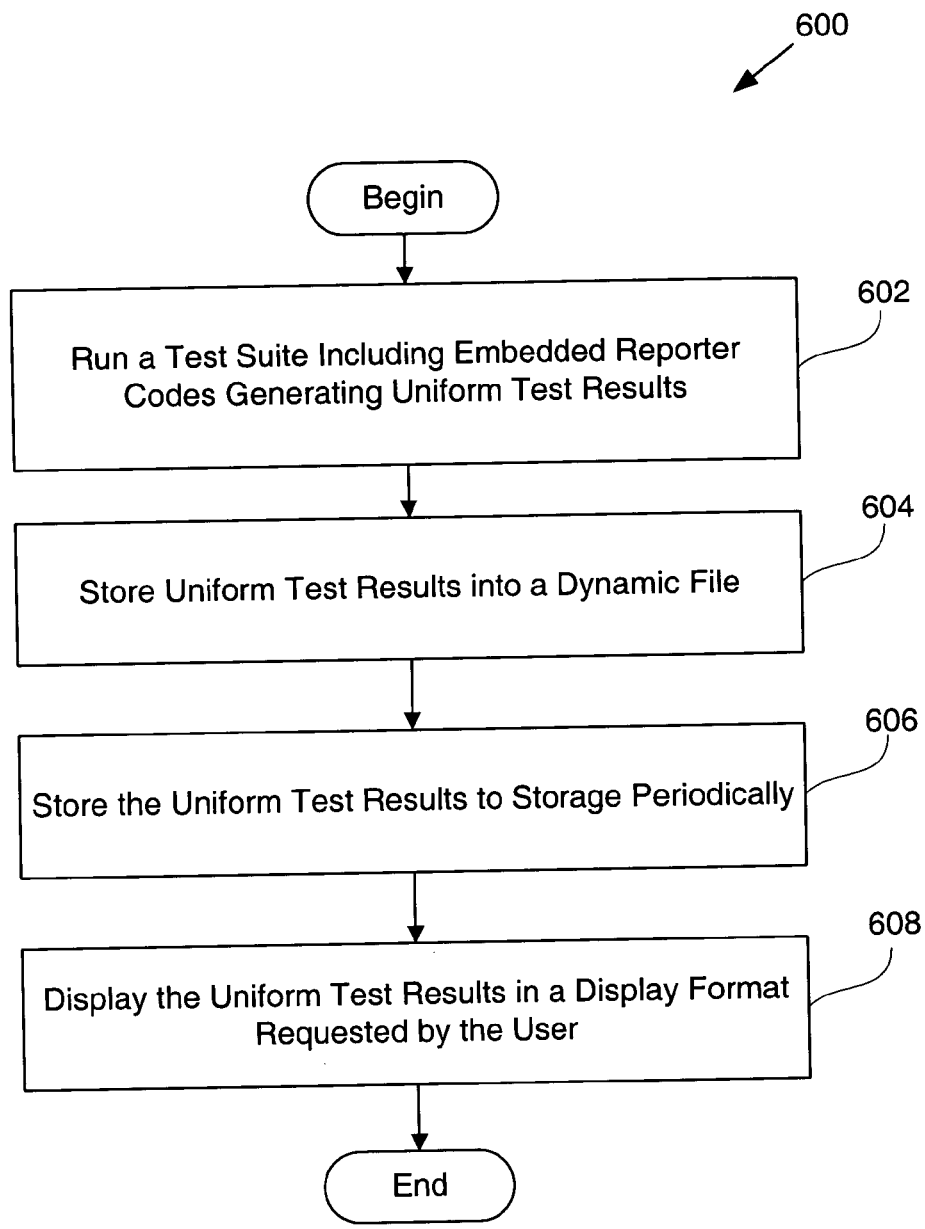
FIG. 6 is a flow chart diagram illustrating a method operations performed by an exemplary reporter tool, in accordance with yet another embodiment of the present invention.

FIG. 6 is a flow chart diagram 600 of a method operations performed by an exemplary reporter tool, in accordance with one embodiment of the present invention. The method begins in operation 602 in which a test suite including embedded reporter codes is run, generating uniform test results. As discussed above, the test suite includes a plurality of tests with each test including a plurality of test cases and the embedded reporter codes (e.g., APIs). Then, in operation 604, the uniform test results are stored to a dynamic file in memory. In one example, the dynamic file has an XML format. Proceeding to operation 606, the uniform test results are stored to storage periodically. In operation 608, the uniform test results are displayed in a display format requested by the user. In one instance, an XSLT interface is implemented to transform the XML format to HTML, a display format requested by the user.

Figure 7:
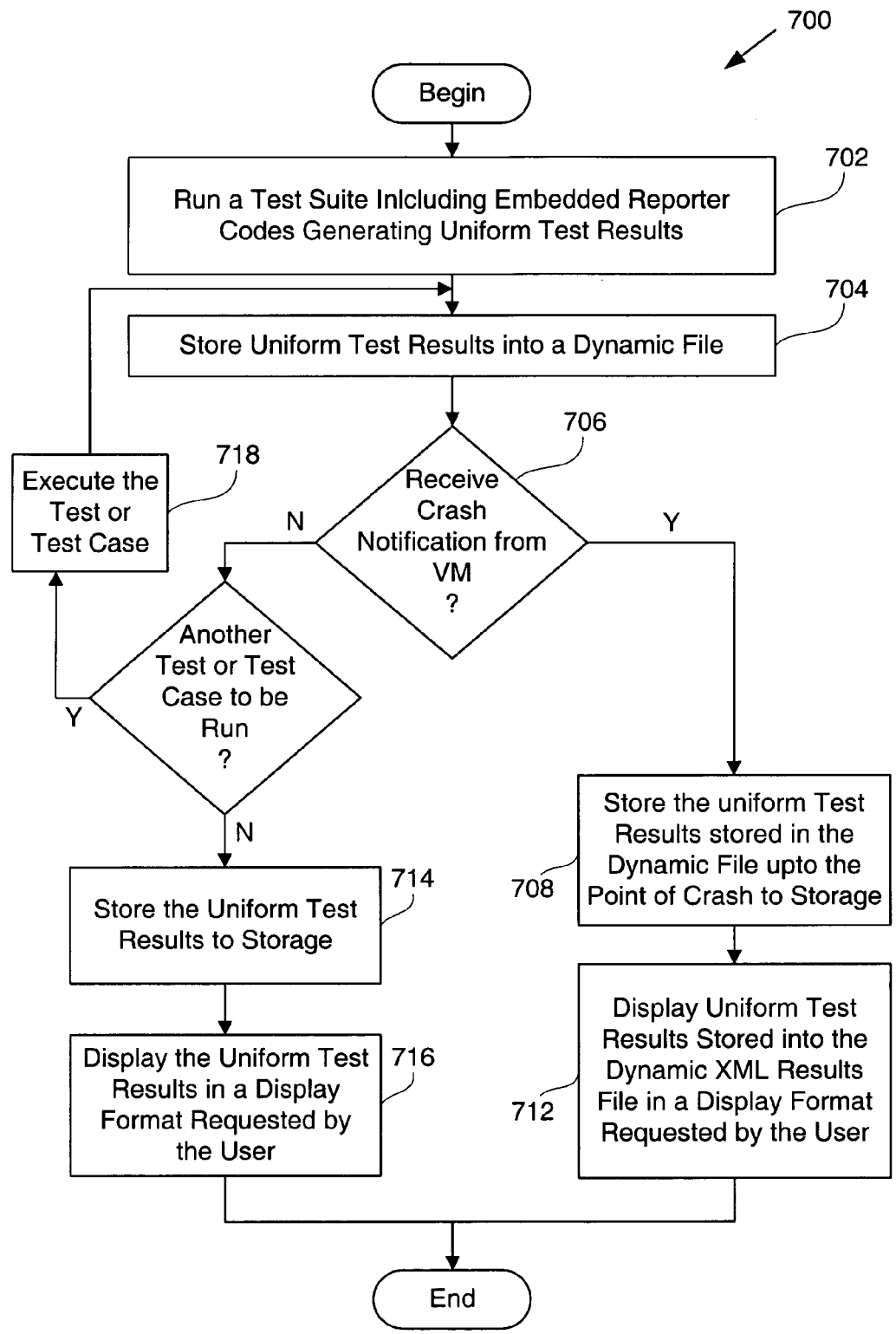
FIG. 7 is a flow chart diagram illustrating a method operations implemented by an exemplary reporter tool to store uniform test results to storage prior to a system crash, in accordance with yet another embodiment of the present invention.

Turning to FIG. 7, a flow chart diagram 700 of a method operations performed by an exemplary reporter tool to store uniform test results to storage prior to a system crash, in accordance with one embodiment of the present invention. The method begins in operation 702 in which a test suite including embedded reporter codes is run generating a uniform test results. Then, in operation 704, the uniform test results are stored to a dynamic file in memory. Next, in operation 706 a determination is made as to whether a crash notification is received from the virtual machine.

If a crash notification has been received, the method continues to operation 708 in which the uniform test results stored to the dynamic file up to the point of crash is stored to storage. Thereafter, in operation 710, the test uniform test results stored to the dynamic XML file is displayed using a display format requested by the user.

Alternatively, if in the operation 706 it is determined that a crash notice has not been received, it is determined whether there exists another test or case to be run in operation 712. If there is another test or test case to be executed, the method continues to execute the remaining tests or test cases and then proceeds to operation 704.

However, if it is determined that all the tests and test cases have been executed, the method continues to operation 714 in which the uniform test results are stored to storage. Then, in operation 716, the uniform test results are displayed using a display format requested by the user.

Figure 8:
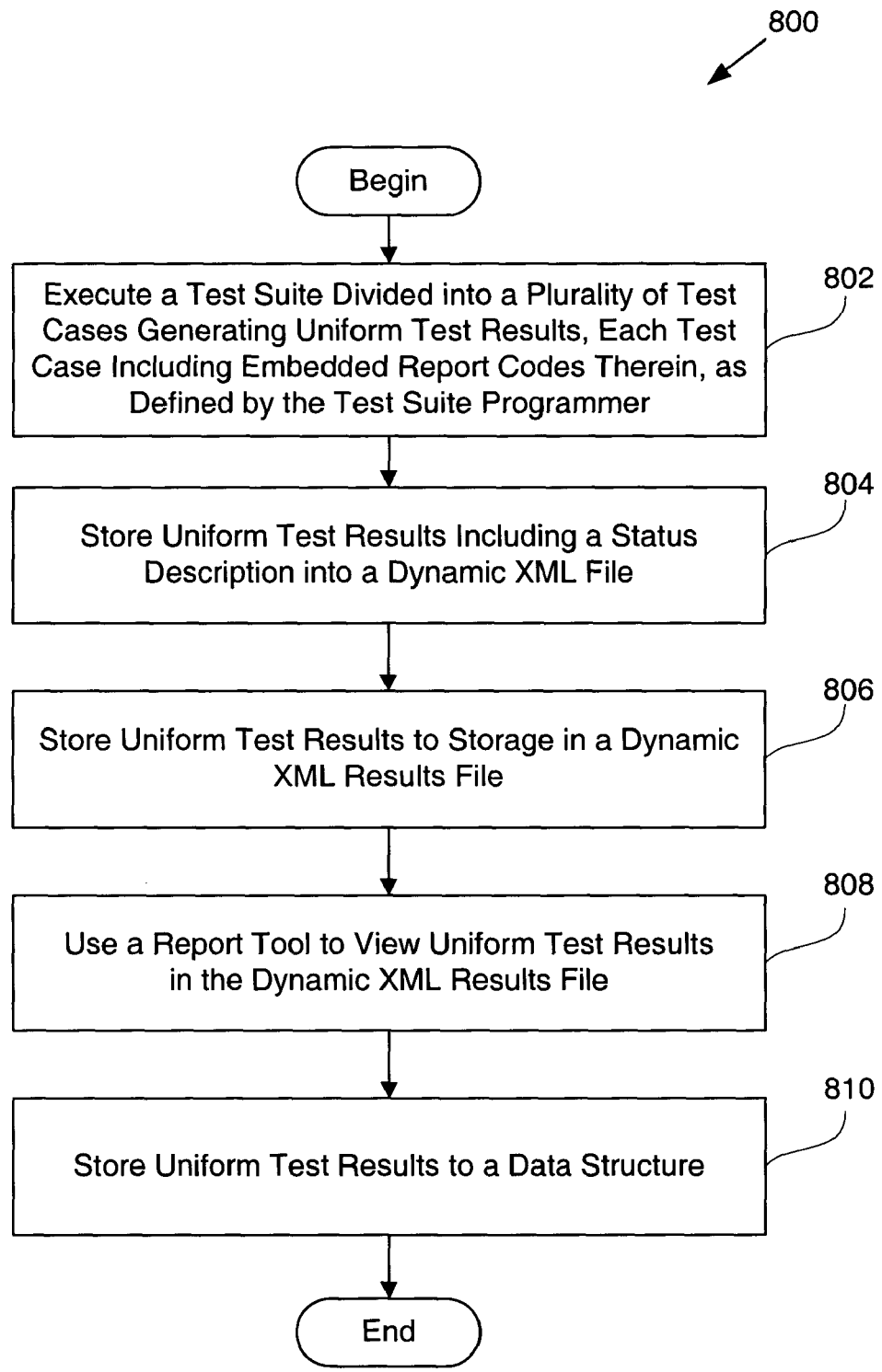
FIG. 8 is a flow chart diagram illustrating a method operations implemented by an exemplary reporter tool, in accordance with yet another embodiment of the present invention.

Reference is made to a flow chart diagram 800 of FIG. 8, depicting a method operations performed by an exemplary reporter tool, in accordance with one embodiment of the present invention. The method begins in operation 802 in which a test suite divided into a plurality of test cases is executed generating uniform test results. As described above, each test case includes embedded reporter codes as defined by the test suite programmer. The method then continues to operation 804 in which the uniform test results including a status description are stored in a dynamic XML file. In one embodiment, however, the uniform test results may not include status description.

Proceeding to operation 806, the uniform test results are stored to storage in a dynamic XML results file. Then, in operation 808 a report tool is used to view uniform test results in the dynamic XML results file. The uniform test results is then stored to a data structure.

Figure 9:
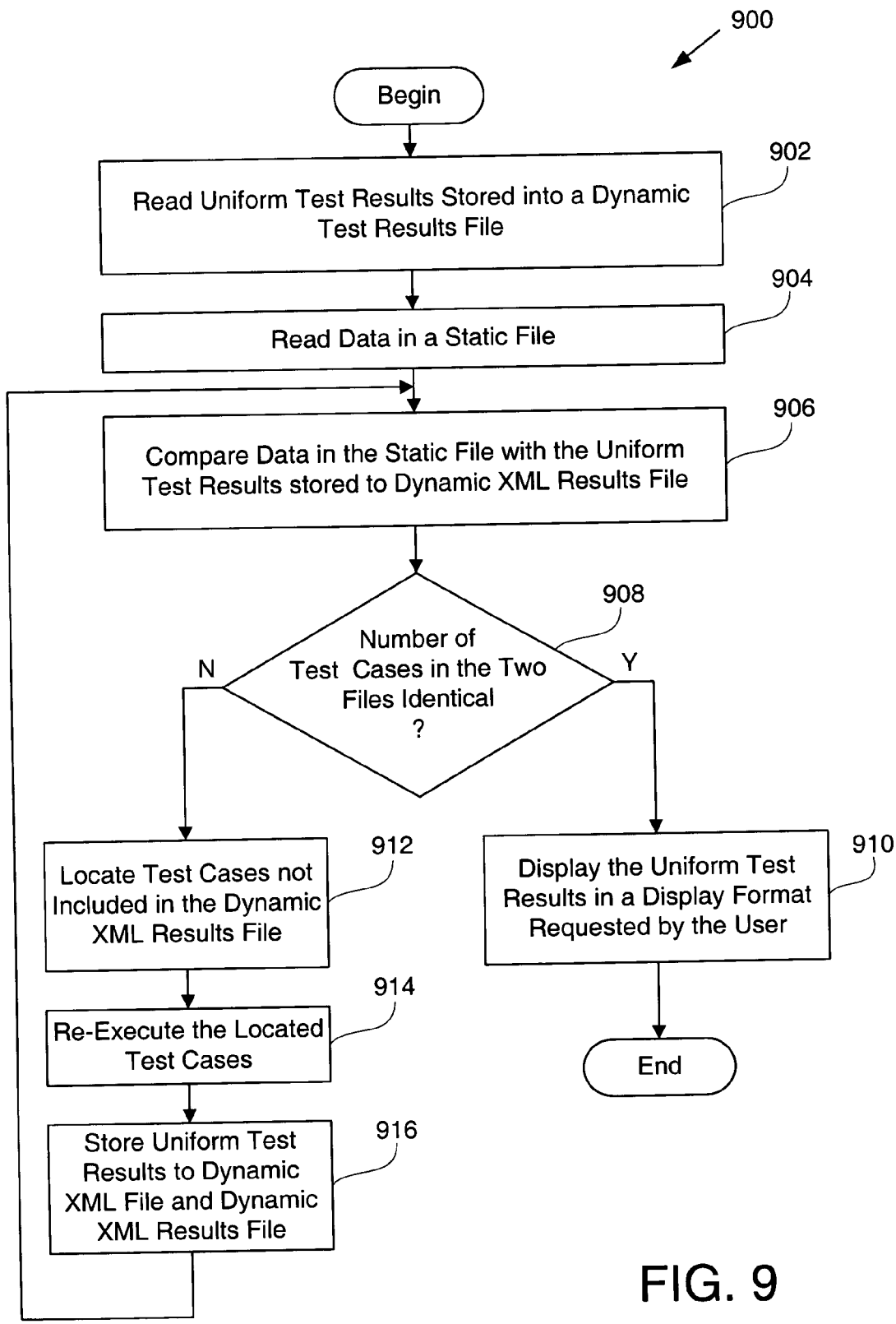
FIG. 9 is a flow chart diagram illustrating a method operations implemented by an exemplary reporter tool to execute the tests or test cases remaining unexecuted after a system crash, in accordance with yet another embodiment of the present invention.

Reference is made to a flow chart diagram 900 of FIG. 9, depicting a method operations performed by an exemplary reporter tool to execute tests or test cases not yet executed due to a system crash, in accordance with one embodiment of the present invention. The method begins in operation 902 in which uniform test results stored to a dynamic test results file is read followed by operation 904 in which data in a static file is read. Then, in operation 906, data in the static file is compared with the uniform test results stored to the dynamic XML results file.

In operation 908 a determination is made as to whether the number of test cases in the static file and number of test cases the dynamic XML results file are identical. If the number of the test cases are identical, the method continues to operation 910 in which the uniform test results is displayed in a display format requested by the user. In the alternative, the method continues to operation 912 in which the test cases not included in the dynamic XML file are located. Then, in operation 914 the located test cases are submitted for re-execution. Next, in operation 916 the uniform test results is stored to the dynamic XML file and dynamic XML results file, consecutively.

The advantages of the present invention are numerous. Most importantly, in contrast to the prior art, the embodiments of the present invention provide consistent and uniform test results easily understandable by all the developers. Another advantage of the present invention is that the test results are stored to storage periodically or prior to a point of crash, limiting the need for re-execution to those tests or test cases defined subsequent to the point of crash. Yet another advantage of the present invention is that multiple virtual machines can be implemented to execute different portions of the test suite. Still another advantage of the present invention is that the generated results are substantially accurate. For instance, almost always the same number of total tests are included in which the status can be a combination of pass/fail/did not execute status. Yet another advantage is that multiple sources (e.g., different languages and different platforms, etc.) can be supported so long as the final data is in the prescribed format. Still another advantage is that the Reporter API can be implemented in different languages and be used by tests written in corresponding languages.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for maintaining standardized test results, the method comprising:
    executing a test suite including embedded reporter codes, the embedded reporter codes capable of being embedded in any location within the test suite, wherein the test suite including the embedded reporter codes is implemented to test a software application;
    generating uniform test results using the embedded reporter codes, the embedded reporter codes configured to include data as to anticipated test results and rationale supporting the anticipated test results; and
    storing the uniform test results so as to allow viewing of the uniform test results.

2. A method as recited in claim 1, wherein the operation of storing the uniform test results so as to allow viewing of the uniform test results includes,
    storing the uniform test results to a dynamic file temporarily; and
    storing the uniform test results stored to the dynamic file to storage in a dynamic test results file.

3. A method as recited in claim 2, the method further comprising,
    displaying the uniform test results in the dynamic test results file in a display format selected by a user.

4. A method as recited in claim 1, wherein the embedded reporter codes are defined in a source code of the test suite as the source code is being written.

5. A method as recited in claim 2, wherein the dynamic file is an Extensible Markup Language (XML) file.

6. A method as recited in claim 2, wherein the dynamic file is a Java object.

7. A method as recited in claim 2, wherein the uniform test results is stored to the dynamic file in a consistent format.

8. A method as recited in claim 2, wherein the dynamic file includes a test case identification, a test case status, and a status description for each test case in the test suite.

9. A method as recited in claim 1, the method further comprising, storing the dynamic test results files to a database.

10. A method for maintaining test results, the method comprising:
    initiating the execution of a plurality of test cases of a test suite so as to generate respective uniform test results, and source code for each of the plurality of test cases including a plurality of embedded reporter codes, the embedded reporter codes capable of being embedded in any location within the test suite, wherein the plurality of test cases of the test suite are implemented to test a software application;
    storing uniform test results to a dynamic file using the plurality of embedded reporter codes; and
    if a system crash notification is received,
        storing the uniform test results generated up to a time of a system crash to storage as uniform test results; and
    if a system crash notification is not received,
        storing the uniform test results to storage at predefined intervals.

11. A method as recited in claim 10, wherein the embedded reporter codes are configured to include anticipated test execution results for each test case and rationale as to obtaining the anticipated test execution results.

12. A method as recited in claim 10, the method further comprising,
    displaying the uniform test results stored to storage in a display format selected by a user.

13. A method as recited in claim 10, wherein the display format is Extensible Stylesheet Language (XSLT) Stylesheet.

14. A method as recited in claim 10, wherein the plurality of embedded reporter codes is an application program interface ("API").

15. A method as recited in claim 10, wherein the dynamic file is an XML file.

16. A method as recited in claim 10, wherein the dynamic file is a Java object.

17. A method for re-executing unexecuted test cases of a test suite being executed, an execution of which having been discontinued as a result of a system crash, the method comprising:
    providing a static file for the test suite, the static file configured to include an entry for each test case in the test suite, wherein the test suite includes embedded reporter codes;
    providing a dynamic file containing uniform test results generated by test cases having been executed up until the system crash;

comparing the static file and the dynamic file;

matching each test case in the dynamic file with a corresponding test case in the static file so as to locate test cases not having a corresponding entry in the dynamic file; and re-executing the test cases missing the corresponding entry in the dynamic file, wherein the test suite including the embedded reporter codes is implemented to test a software application.

18. A method as recited in claim 17, wherein the static file is an XML file.

19. A method as recited in claim 17, wherein the dynamic file is an XML dynamic file.

20. A method as recited in claim 17, wherein the dynamic file is a Java object.

21. A method for maintaining standardized test results, the method comprising:

executing a test suite including embedded reporter codes, the embedded reporter codes capable of being embedded in any location within the test suite, wherein the test suite including the embedded report codes is implemented to test a software application;

generating uniform test results using the embedded reporter codes;

storing uniform test results to a dynamic file temporarily; and storing the uniform test results in the dynamic file to storage in a dynamic test results file.

* * * * *